United States Patent
Thybo et al.

(10) Patent No.: US 7,992,396 B2
(45) Date of Patent: Aug. 9, 2011

(54) METHOD OF ANALYSING A REFRIGERATION SYSTEM AND A METHOD OF CONTROLLING A REFRIGERATION SYSTEM

(75) Inventors: Claus Thybo, Soenderborg (DK); Lars Finn Sloth Larsen, Sydals (DK)

(73) Assignee: Danfoss A/S, Nordborg (DK)

( * ) Notice: Subject to any disclaimer, the term of this patent is extended or adjusted under 35 U.S.C. 154(b) by 885 days.

(21) Appl. No.: 11/602,089

(22) Filed: Nov. 20, 2006

(65) Prior Publication Data

US 2007/0130971 A1    Jun. 14, 2007

(30) Foreign Application Priority Data

Nov. 24, 2005   (DK) ................................. 2005 01656

(51) Int. Cl.
*F25B 5/00*    (2006.01)
*F25D 21/06*    (2006.01)
*G05D 23/32*    (2006.01)
(52) U.S. Cl. ................. 62/155; 62/200; 62/157
(58) Field of Classification Search .................. 62/199, 62/200, 179, 180, 182, 155
See application file for complete search history.

(56) References Cited

U.S. PATENT DOCUMENTS

| | | | | |
|---|---|---|---|---|
| 2,048,711 A * | 7/1936 | Ridge | ............................. | 62/200 |
| 2,145,298 A * | 1/1939 | Eisinger | ............................. | 62/179 |
| 2,182,318 A * | 12/1939 | Newill | ............................. | 62/200 |
| 4,356,961 A | 11/1982 | Smith | ............................. | 236/1 |
| 4,510,767 A * | 4/1985 | Komatsu et al. | ............................. | 62/200 |
| 5,035,119 A * | 7/1991 | Alsenz | ............................. | 62/225 |
| 5,460,008 A | 10/1995 | Ott et al. | ............................. | 62/175 |
| 5,533,347 A | 7/1996 | Ott et al. | ............................. | 62/115 |
| 5,586,444 A | 12/1996 | Fung | ............................. | 62/117 |
| 6,000,232 A * | 12/1999 | Witten-Hannah et al. | ........ | 62/89 |
| 6,006,527 A | 12/1999 | Hansen et al. | ............................. | 62/157 |
| 6,658,878 B2 | 12/2003 | Shim et al. | ............................. | 62/229 |
| 7,461,515 B2 * | 12/2008 | Wellman | ............................. | 62/151 |
| 2002/0124585 A1 * | 9/2002 | Bash et al. | ............................. | 62/228.4 |
| 2004/0016254 A1 * | 1/2004 | Park | ............................. | 62/229 |
| 2004/0020224 A1 | 2/2004 | Bash et al. | ............................. | 62/228.4 |
| 2004/0093893 A1 | 5/2004 | Tanimoto et al. | ............................. | 62/510 |
| 2004/0144111 A1 | 7/2004 | Matsuoka | ............................. | 62/224 |
| 2005/0251364 A1 * | 11/2005 | Kang et al. | ............................. | 702/183 |
| 2006/0123815 A1 * | 6/2006 | Kim et al. | ............................. | 62/200 |
| 2009/0217684 A1 * | 9/2009 | Ouchi et al. | ............................. | 62/155 |

* cited by examiner

*Primary Examiner* — Judy J Swann
*Assistant Examiner* — Alexis K Cox
(74) *Attorney, Agent, or Firm* — McCormick, Paulding & Huber LLP

(57) ABSTRACT

A method of analyzing a refrigeration system (1) comprising at least one compressor (4), at least one condenser (5) and at least two refrigeration entities (2), each comprising at least one evaporator (9). Based on information relating to the gas production by the evaporators (9) it is determined whether or not two or more evaporators (9) are running in a synchronized manner, i.e. are switching between an active and an inactive state at least substantially simultaneously. In case two or more evaporators (9) are running in a synchronized manner, the refrigeration system (1) may be controlled in order to desynchronize the evaporators (9). This may, e.g., be done by changing a cut-in temperature and/or a cut-out temperature for one of the corresponding refrigeration entities (2). Synchronization causes undesired variations in the suction pressure, and preventing synchronization therefore results in a more appropriate control of the refrigeration system (1). Reduces wear on the compressors (4). Furthermore, a method of applying settings to a plurality of refrigeration entities (2) in such a way that synchronization is prevented or at least reduced considerably.

7 Claims, 13 Drawing Sheets

METHOD OF ANALYSING A REFRIGERATION SYSTEM AND A METHOD OF CONTROLLING A REFRIGERATION SYSTEM

CROSS REFERENCE TO RELATED APPLICATIONS

Applicant hereby claims foreign priority benefits under U.S.C. §119 from Danish Patent Application No. PA 2005 01656 filed on Nov. 24, 2005 the contents of which are incorporated by reference herein.

FIELD OF THE INVENTION

The present invention relates to a method of analysing a refrigeration system in order to determine whether or not the refrigeration system is running in an appropriate manner. The present invention further relates to a method of controlling a refrigeration system in an optimum manner. More particularly, the invention relates to a method of detecting if two or more evaporators of a refrigeration system are running in a synchronized manner, and to a method of providing a remedy in case two or more evaporators of a refrigeration system are running in a synchronized manner.

BACKGROUND OF THE INVENTION

Some refrigeration systems comprise two or more refrigeration entities, e.g. in the form of display cases or refrigerated rooms. Each refrigeration entity comprises one or more evaporators, each being adapted to be in an active state in which a flow of refrigerant is allowed to pass along an evaporating surface, and in an inactive state in which such a flow is prevented. The evaporators can be switched between the active and the inactive states in order to obtain and maintain a temperature within a desired temperature range inside a refrigeration compartment of the refrigeration entity. Refrigeration systems of this kind often comprise a variable capacity compressor device, e.g. in the form of a compressor rack of two or more compressors. Thereby it is possible to adjust the refrigeration capacity of the refrigeration system (i.e. the amount of liquid refrigerant removed by the compressors from the evaporators of the refrigeration entities) to meet a refrigeration demand (i.e. the amount of gaseous refrigerant produced by the evaporators). In case the variable compressor device is in the form of a compressor rack, the refrigeration capacity is typically adjusted by switching compressors of the compressor rack on or off. If this is done relatively frequently, it results in significant wear on the compressors. The refrigeration demand of each refrigeration entity depends on the applied control strategy and on the external load on the refrigeration entity in question. In the present context the term 'load' should be interpreted to mean the heat applied to the refrigeration entity. Thus, changes in the load are normally caused by exterior effects, such as positioning new (most likely warmer) products in a refrigeration compartment of a refrigeration entity, or applying a night cover to one or more refrigeration entities.

It is desirable to keep the total refrigeration demand of the refrigeration system as close to the total load of the refrigeration system as possible. Thereby compressors need only to be switched on or off when it is necessary to meet a change in the load caused by exterior effects as described above. Thereby switching compressors on or off is avoided to the greatest extent possible.

Refrigeration systems as the ones described above are often used in supermarkets, where several display cases are normally present.

It has previously been attempted to reduce the wear on compressors of a refrigeration system by reducing the number of times the compressors are switched on or off. One example of such an attempt is disclosed in U.S. Pat. No. 5,533,347. U.S. Pat. No. 5,533,347 discloses a method of controlling a refrigeration case of a refrigeration system. The method comprises the steps of locating an expansion valve of a refrigeration case, moving the expansion valve of the refrigeration case out of a predetermined position, sampling temperature readings from an evaporator coil of a refrigeration case, calculating an adaptive proportional-integral-differential (PID) of the temperature of the evaporator coil for the refrigeration case, and moving the expansion valve to a second position closer to the predetermined position based on the calculated proportional-integral-differential until the temperature of the evaporator coil for the refrigeration case is within a predetermined temperature range. One advantage is that the amount of time may be increased between switching on and off the next stage of the compressor rack by using the deadband area of control within each refrigeration case load to regulate only when the compressors cannot maintain control. Thereby switching compressors on or off is avoided to some extent.

However, when large variations in the refrigeration demand occur, the method disclosed in U.S. Pat. No. 5,533,347 is not sufficient to meet the refrigeration demand, and it is therefore necessary to switch compressors on or off. It is, therefore, desirable to be able to even further reduce the wear on the compressors.

SUMMARY OF THE INVENTION

It is, thus, an object of the invention to provide a method for analysing a refrigeration system, the method providing a tool for reducing the wear on the compressors to a greater extent than it is possible when using prior art control methods.

It is a further object of the invention to provide a method for analysing a refrigeration system, the method providing a tool for controlling the refrigeration demand of the refrigeration system to be at least substantially equal to the total load.

It is an even further object of the invention to provide a method for controlling a refrigeration system, the method reducing the wear on the compressors to a greater extent than it is possible when using prior art control methods.

It is an even further object of the invention to provide a method for controlling a refrigeration system, the method keeping the refrigeration demand of the refrigeration system closer to the total load than prior art control methods.

It is an even further object of the present invention to provide a method for controlling a refrigeration system, the method being applicable to existing refrigeration systems without requiring substantial modifications to these.

According to a first aspect of the invention the above and other objects are fulfilled by providing a method of analysing a refrigeration system comprising at least one compressor, at least one condenser and at least two refrigeration entities, each having a separate refrigeration volume, and each comprising at least one evaporator, each evaporator being adapted to be in an active state in which a flow of refrigerant is allowed to pass across an evaporating surface, and in an inactive state in which such a flow is prevented, the method comprising the steps of:

obtaining information relating to the gas production provided by the evaporators as a function of time,
analysing the obtained information, and
based on the analysing step, determining whether or not two or more of the evaporators are running in a synchronized manner.

In the present context the term 'refrigeration entity' should be interpreted to mean a location where refrigeration of products takes place. Thus, a refrigeration entity may be a display case, e.g. the kind which is normally used in a supermarket. The display cases may be open display cases or the kind having a door which the customer needs to open in order to gain access to the products being refrigerated. Alternatively, a refrigeration entity may be a larger entity, such as a closed refrigeration room, e.g. the kind which may be used in restaurants or a slaughterhouse. The refrigeration system may comprise refrigeration entities of various kinds, e.g. two or more of the kinds described above. Alternatively, the refrigeration system may comprise only one kind of refrigeration entities.

The method comprises the step of obtaining information relating to the gas production provided by the evaporators as a function of time. This may, e.g., be done by measuring either the gas production directly or by measuring a parameter which depends on the gas production. Such parameters may, e.g., be a mass flow through the system, a suction pressure measured during a time period wherein no compressors are switched on or off, or a refrigeration capacity. The mass flow and the refrigeration capacity are mutually dependent via the equation $\dot{Q}=\dot{m}\cdot\Delta h$, wherein $\dot{Q}$ is the refrigeration capacity, $\dot{m}$ is the mass flow and $\Delta h$ is the specific enthalpy uptake of the refrigerant in the evaporator. Alternatively or additionally, any other suitable parameter may be measured, as long as the parameter provides information relating to the gas production of the evaporators.

At least some of the steps of the method may advantageously be performed in a location remotely from the location of the refrigeration system. Thus, the steps may be performed from a monitoring centre. Such a monitoring centre may be given the task of monitoring a number of refrigeration systems simultaneously or sequentially, and, in case it is discovered that two or more refrigeration entities are running in a synchronized manner, alerting the owner or relevant maintenance personnel, and/or solving the problem. This is very advantageous. Such monitoring centres may also handle alarms. In this case the refrigeration systems are monitored locally, and in case it is discovered that something must be wrong in a refrigeration system (e.g. in case a maximum temperature in a refrigeration entity is exceeded by a substantial amount), an alarm is sent to the monitoring centre, and the personnel at the monitoring centre will then identify the reason for the problem and solve it, e.g. by sending a technician in order to replace a broken part. Monitoring centres already exist which perform such tasks, and these may advantageously perform at least some of the steps of the method.

Furthermore, since the method according to the first aspect of the invention only uses information which is readily available in most existing refrigeration systems, it can easily be applied to such existing systems without requiring modifications to the normal control algorithms or the physical parts of the existing refrigeration systems, and without requiring a detailed knowledge of the refrigeration systems. Thus, by means of the present invention, operation of existing refrigeration systems can be considerably improved without incurring additional costs in the form of new parts for the system or completely new control algorithms. This is very advantageous.

If evaporators of several refrigeration entities are switched to an active or an inactive state simultaneously or almost simultaneously, there is a risk that the refrigeration demand will be affected significantly. It is therefore desirable to avoid this. When two evaporators start switching between the active and the inactive states substantially simultaneously, these two evaporators can be regarded as running in a synchronized manner. Thus, when two or more evaporators of a refrigeration system are running in a synchronized manner, there is a great risk that the refrigeration demand of the system will start to vary significantly, resulting in excessive switching on/off of compressors. In some refrigeration systems it may occur that the compressors wear out prematurely due to excessive switching on or off, and the precise reason for this has not been known previously. It has come to the attention of the inventors of the present invention that synchronization may be causing the problem in these refrigeration systems. It has also come to the attention of the inventors that in refrigeration systems comprising two or more refrigeration entities, the evaporators seem to affect each other in such a manner that, under certain conditions, their operation will eventually become synchronized, and that the synchronization effect is a self-increasing effect in the sense that once two evaporators are running in a synchronized manner, additional evaporators tend to also start running in a synchronized manner with respect to these evaporators. It is therefore a great advantage of the invention that it makes it possible to detect whether or not two or more evaporators are running in a synchronized manner, and/or whether or not there is a risk that synchronization will occur within the near future. Thereby it is possible to take appropriate actions to prevent or limit the synchronization, and accordingly the wear on the compressors can be considerably reduced.

Thus, in case a refrigeration system is not running in an optimum manner it is possible, using the method according to the first aspect of the invention, to determine whether synchronization is the cause of the problem, and, in case it is, it is possible to redress the problem in an appropriate manner. Thereby the wear on the compressors is reduced as compared to prior art control methods.

Furthermore, using the method according to the first aspect of the invention, it is possible to detect possible future 'candidates' for synchronized operation, and synchronization can thereby be prevented, even before it occurs. This is very advantageous.

The step of obtaining information may comprise obtaining information relating to the number of active evaporators as a function of time, and the analysing step may comprise obtaining a representative of the variance of the function of time. In this case the determining step may comprise determining that at least two evaporators are running in a synchronized manner if the representative of the variance exceeds a predefined threshold value.

The representative of the variance of the function may, e.g., be the variance, the standard deviation or any other suitable value which gives a measure for the variance of the signal.

According to this embodiment the number of active evaporators is counted. If an evaporator is switched from the active state to the inactive state, this number is reduced, and if an evaporator is switched from the inactive to the active state, the number is increased. There is a direct connection between the number of active evaporators and the gas production provided by the evaporators, since only the active evaporators produce gas. By monitoring this parameter over a period of time, information relating to the gas production as a function of time is therefore obtained. If the variance of the obtained function is relatively large, a relatively large number of evaporators are switched between the active and inactive states simultaneously or almost simultaneously, i.e. these evaporators are running in a synchronized manner. On the other hand, if the variance of the signal is relatively small, at least a major part of the evaporators are switched between the active and inactive states in a mutually independent manner, i.e. they are not running in a synchronized manner. Therefore, it can be determined that at least two evaporators are running in a synchronized manner if the variance of the function exceeds a predefined threshold value. The above procedure is relatively easy to perform, and it provides a relatively quick method for determining whether or not synchronization is occurring in the refrigeration system. However, it does not provide information as to which evaporators are causing a potential problem. Thus, the described procedure may advantageously be used as a first step in an analysing procedure. If it turns out that none of the evaporators are running in a synchronized manner, nothing further will be done. If it, on the other hand, turns out that there is a problem, further and more thorough investigations may be performed in order to identify the evaporators which are causing the problem. This is particularly advantageous in case the method is performed from a monitoring centre which is monitoring a number of refrigeration systems.

Alternatively or additionally, the method may further comprise the step of obtaining information relating to a suction pressure of the compressor(s), and the analysing step may comprise obtaining a covariance between the information relating to the gas production provided by the evaporators and the information relating to a suction pressure, and the determining step may comprise determining that at least two evaporators are running in a synchronized manner if said covariance exceeds a predefined threshold value.

In this embodiment a covariance may be obtained between active/inactive periods of each evaporator and the suction pressure. If there are relatively large variations in the suction pressure as a function of time, it is desirable to determine which evaporators are contributing to these variations. If an evaporator is in the active state in periods where the suction pressure is high and in the inactive state in periods where the suction pressure is low, there is a high probability that this evaporator is running in a synchronized manner relatively to one or more of the other evaporators, and that it is therefore contributing to the problem.

Alternatively or additionally, a covariance between a temperature of air flowing into an evaporator, a temperature of air flowing out of an evaporator and/or an evaporator temperature, on the one hand, and a suction pressure, an evaporating temperature and/or a mass flow, on the other hand, may be obtained.

The procedure described above may advantageously be used as a 'second step' in case it has previously been determined that synchronization is occurring in the refrigeration system, e.g. as described above.

The step of obtaining information may comprise obtaining information relating to durations of active and/or inactive periods for each evaporator, and the determining step may comprise determining that at least two evaporators are running in a synchronized manner if said durations are at least substantially coinciding for at least two evaporators.

According to this embodiment the durations or 'lengths' of the active and inactive periods for each of the evaporators are determined. In case it is determined that, for two or more evaporators, these durations are at least substantially identical, there is a risk that these evaporators are running in a synchronized manner, or that they will at a later time be running in a synchronized manner. This is particularly a risk if the durations of 'full periods', e.g. the combined duration of an active period followed by an inactive period, are substantially identical, and particularly if they are also temporally coinciding. However, in case the durations of the active periods or the durations of the inactive periods are substantially identical, this also indicates that the corresponding evaporators may be running in a synchronized manner.

In case the durations as defined above are at least substantially identical, but the active/inactive periods are not temporally coinciding, the corresponding evaporators are not running in a synchronized manner. However, since the durations of the active and/or inactive periods are at least substantially identical, there is a risk that they will eventually coincide temporally, and thereby be running in a synchronized manner. If this situation is detected, it is possible to attend to the problem, even before it occurs, and it may thereby be prevented that synchronization occurs in the refrigeration system. This is very advantageous because it may thereby be ensured that the refrigeration system continues to operate in an optimum manner.

The method may further comprise the step of adjusting at least one run parameter of at least one evaporator in case the determining step reveals that at least two evaporators are running in a synchronized manner. According to this embodiment the information that at least two evaporators are running in a synchronized manner is used for correcting the problem.

The adjusting step may comprise changing at least one of a cut-in temperature and a cut-out temperature for at least one evaporator. When the cut-in temperature and/or the cut-out temperature for an evaporator is/are changed, the duration(s) of the active and/or inactive periods for that evaporator is/are also changed. Thus, if two evaporators are running in a synchronized manner, i.e. they are switched between the active and inactive states substantially simultaneously, changing the cut-in temperature and/or the cut-out temperature for one of these evaporators will have the effect that one of the evaporators will reach the cut-in temperature and/or the cut-out temperature before the other evaporator, and the evaporators will therefore no longer be switched between the active and inactive states simultaneously. Thereby they will no longer be running in a synchronized manner.

Alternatively or additionally, the adjusting step may comprise lowering a reference suction pressure of the compressor(s) for a period of time. In refrigeration systems comprising two or more compressors, e.g. arranged in a compressor rack, this is typically obtained by switching an additional compressor on. Thereby it is obtained that additional liquid refrigerant is made available to the evaporators, and it is therefore possible to maintain relatively low evaporating temperatures. As a consequence it becomes easier to drive the evaporator temperatures and the air temperatures of the refrigeration entities down when the evaporators are in the active state, and the air temperatures therefore reach their respective cut-out temperatures relatively fast. This has the consequence that the evaporators are less inclined to start running in a synchronized manner. Accordingly, this step is typically performed in addition to one or more other adjustments, thereby enhancing the effects of this/these adjustment(s).

Alternatively or additionally, the adjusting step may comprise controlling a refrigeration rate of at least one evaporator. This may, e.g., be done by controlling a refrigeration capacity of at least one evaporator by controlling the amount of available refrigerant. This may, e.g., be done by 'starving' the evaporator, i.e. by reducing the amount of refrigerant entering the evaporator. This may, e.g., be done by increasing the superheat of the evaporator in question.

Alternatively, a refrigeration rate of at least one evaporator may be controlled by controlling a rotational speed of a fan positioned at or near the evaporating surface of at least one evaporator.

For all of these examples the consequence is that the air temperature decrease when the evaporator in question is in the active state will be slower, i.e. it will take a longer time from the evaporator is switched to the active state and until the cut-out temperature is reached.

According to a second aspect of the invention, the above and other objects are fulfilled by providing a method of controlling a refrigeration system comprising at least one compressor, at least one condenser and at least two refrigeration entities, each having a separate refrigeration volume, and each comprising at least one evaporator, each evaporator being adapted to be in an active state in which a flow of refrigerant is allowed to pass across an evaporating surface, and in an inactive state in which such a flow is prevented, the method comprising the step of:

for at least one evaporator, affecting a representative time period running from a time where said evaporator is switched to an active/inactive state until the next time said evaporator is switched to an active/inactive state, thereby preventing said evaporator(s) from running in a synchronized manner relatively to at least one other evaporator.

For a typical evaporator in a typical refrigeration system the time elapsing from the evaporator is switched to an active/inactive state until the next time this occurs is not completely fixed. However, the variations will normally not be dramatic, and a representative time period may therefore be defined.

In case two evaporators are running in a synchronized manner, their representative time periods will be at least substantially identical. Accordingly, affecting the representative time period of one of the evaporators will result in a difference in the representative time periods for the two evaporators, and consequently they will no longer be running in a synchronized manner.

Thus, the method according to the second aspect of the invention provides a remedy for preventing or redressing a synchronization problem in a refrigeration system. The method according to the second aspect of the invention may be applied after it has been detected that synchronization has occurred in a refrigeration system. However, it may also be applied without knowing for sure that synchronization is occurring, e.g. in a case where it has been detected that the refrigeration system is not running in an optimum manner because the compressors are switching on and off too frequently. Since synchronization may in this case be causing the problem, the method according to the second aspect of the invention may be applied, and if it solves the problem, synchronization was probably the cause.

The adjusting step may comprise changing at least one of a cut-in temperature and a cut-out temperature for at least one evaporator and/or lowering a reference suction pressure of the compressor(s) for a period of time and/or controlling a refrigeration rate of at least one evaporator. This has already been described in detail above.

According to a third aspect of the invention, the above and other objects are fulfilled by providing a method of applying settings to a plurality of refrigeration entities having identical temperature requirements, the settings comprising a lower temperature limit and an upper temperature limit, wherein an evaporator of the corresponding refrigeration entity is switched to an inactive state in case an air temperature of the refrigeration entity decreases below the lower temperature limit, and the evaporator is switched to an active state in case the air temperature increases above the upper temperature limit, the lower temperature limit and the upper temperature limit thereby defining a deadband temperature interval, the method comprising the steps of:

applying settings to a first refrigeration entity selected among the plurality of refrigeration entities, copying the settings from the first refrigeration entity to each of the remaining refrigeration entities while applying a function to the values of the lower temperature limit and the upper temperature limit, the copied lower temperature limits thereby being distributed within a first predefined temperature interval, and the copied upper temperature limits being distributed within a second predefined temperature interval.

It should be noted that the skilled person would readily recognise that any feature described in connection with the first aspect of the invention can also be combined with the second and third aspects of the invention, any feature described in connection with the second aspect of the invention can also be combined with the first and third aspects of the invention, and any feature described in connection with the third aspect of the invention can also be combined with the first and second aspects of the invention.

In the present context the term 'settings' should be interpreted to mean a set of various parameters, which it is necessary to define and set in order to run the refrigeration entity. Examples of such parameters are lower and upper temperature limits, superheat set point, fan speed of the evaporator fan, orifice size, filling speed, addresses for temperature sockets, maximum defrost time, defrost-on-demand, defrost schedule, and/or any other suitable parameter.

The upper temperature limit is normally denoted the cut-in temperature, and the lower temperature limit is normally denoted the cut-out temperature.

The plurality of refrigeration entities have identical temperature requirements. This typically implies that the maximum air temperature allowed in the refrigerated volume is the same for all the refrigeration entities. Thus the refrigeration entities are meant to refrigerate identical or similar products, i.e. products which require storage at identical or similar temperatures.

When applying settings to a plurality of refrigeration entities having identical temperature requirements, the settings are normally applied manually to one refrigeration entity, and the manually applied settings, including the temperature limits, are then copied to the remaining refrigeration entities. This is a very easy way of applying settings to a relatively large number of refrigeration entities, since the time consuming process of applying the settings manually to each of the refrigeration entities is avoided. Since the settings for all the refrigeration entities will in this case be identical, there is a risk that the evaporators of two or more of the refrigeration entities will at some point in time start switching between their active and inactive states simultaneously or almost simultaneously, i.e. two or more evaporators will start to run in a synchronized manner.

The method according to the third aspect of the invention, however, also comprises the step of copying the settings from the first refrigeration entity to the remaining refrigeration entities, but when performing this step a function is applied to the lower and upper temperature limits. This has the effect that the copied lower temperature limits are distributed within a first predefined interval, and the copied upper temperature limits are distributed within a second predefined interval. Thus, once the settings have been applied to the first refrigeration entity, all the settings, except the temperature limits, are simply copied to the remaining refrigeration entities, thereby avoiding applying the settings manually to each of the refrigeration entities, and thereby saving time. But, contrarily to the prior art method described above, it is ensured that the temperature limits vary slightly among the refrigeration entities. As a result, the hysteresis limits for the refrigeration entities will also vary slightly. This has the consequence that the risk that the evaporators of the refrigeration entities will at some time start to switch between their active an inactive states simultaneously, i.e. start running in a synchronized manner, is considerably reduced.

Thus, when settings are applied to a plurality of refrigeration entities in a manner according to the third aspect of the invention, the advantages with respect to avoiding manually applying the settings to each of the refrigeration entities are maintained, but at the same time the risk that the evaporators of two or more refrigeration entities will at some time start running in a synchronized manner is considerably reduced. This is a great advantage since the chances that the refrigeration system continues to run in an optimum manner are considerably increased. Thus, the third aspect of the invention provides a method of applying settings to a plurality of refrigeration entities in such a way that the risk of later synchronization is considerably reduced, i.e. the potential problems are prevented initially and before they arise.

According to one embodiment the length of the first predefined temperature interval and/or the length of the second temperature interval may be a specific fraction of the length of a maximum possible deadband temperature interval. In this case the length of the maximum possible deadband may be defined by the lower and upper temperature limits which are initially applied to the first refrigeration entity. When the settings are subsequently copied to the remaining refrigeration entities, this may be performed in such a way that the copied lower temperature limits are allowed to vary, e.g. randomly, between the initially defined lower temperature limit and a defined lower temperature which is higher than the initially defined lower temperature limit, but much lower than the initially defined upper temperature limit, i.e. the copied lower temperature limits are still relatively close to the initially defined lower temperature limit. Similarly, the copied upper temperature limits may be allowed to vary, e.g. randomly, between the initially defined upper temperature limit and a defined upper temperature limit which is lower than the initially defined upper temperature limit, but still relatively close to it. For instance, the initially defined lower temperature limit may be 2° C., and the copied lower temperature limits may be allowed to vary between 2° C. and 2.5°, and the initially defined upper temperature limit may be 5° C., and the copied upper temperature limits may be allowed to vary between 4.5° C. and 5° C.

The specific fraction may, e.g., be less than or equal to 20%, such as less than or equal to 15%, such as less than or equal to 10%. Alternatively, the specific fraction may be higher than 20%, e.g. 25% or 30%.

The step of copying the settings may comprise applying a randomizing function to the values of the lower temperature limit and the upper temperature limit. In this case the copied temperature limits are allowed to vary in a random manner within the predefined temperature intervals. Alternatively, the applied function may be of a more well defined nature, e.g. a function which systematically and incrementally lowers the upper temperature limit and raises the lower temperature limit each time the settings are copied to another refrigeration entity.

However, it should be ensured that, for each refrigeration entity, the copied cut-in temperature is higher than the copied cut-out temperature.

The step of applying settings to a first refrigeration entity may be performed manually. Alternatively, the settings which are applied to the first refrigeration entity may be copied from a similar refrigeration entity running in a different refrigeration system. In this case manual adjustments to the settings may be required in order to meet special conditions of the refrigeration system.

BRIEF DESCRIPTION OF THE DRAWINGS

The invention will now be described in further details with reference to the accompanying drawing in which.

DETAILED DESCRIPTION OF THE INVENTION

Figure 1:
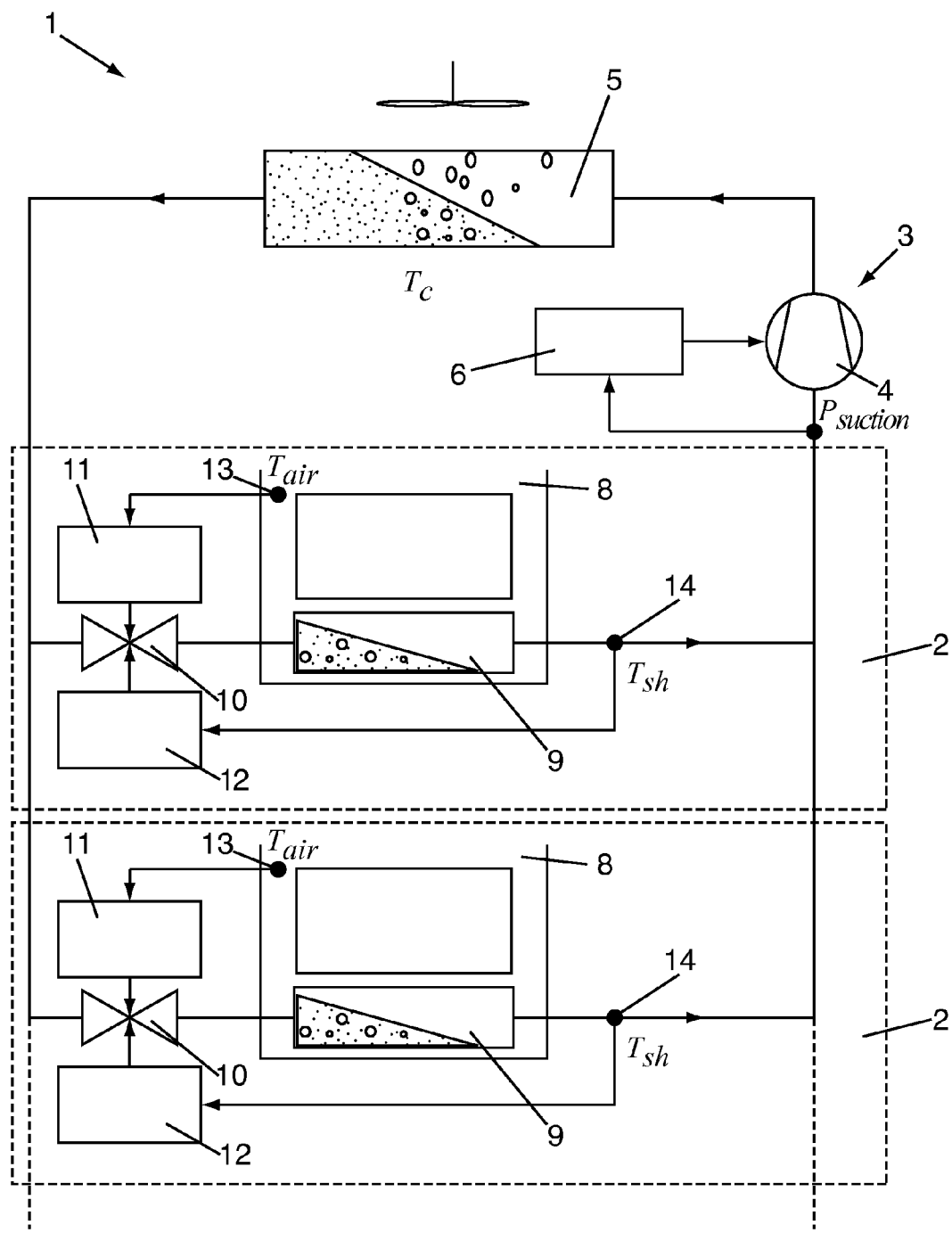
FIG. 1 is a schematic drawing of a refrigeration system comprising a number of refrigeration entities, the refrigeration system being controlled by means of a prior art control method.

FIG. 1 is a schematic drawing of a refrigeration system 1 comprising a number of refrigeration entities 2, a compressor rack 3 comprising a number of compressors 4, and a condenser 5. In the Figure, two refrigeration entities 2 are shown, but one or more additional refrigeration entities 2 may be added as illustrated by the punctured line. The refrigeration entities 2 are coupled in parallel to each other, and each refrigeration entity 2 is coupled in series to the compressor rack 3 and the condenser 5. The refrigeration system 1 illustrated in FIG. 1 is of the kind which is typically used in supermarkets. The refrigeration system 1 shown in FIG. 1 is controlled according to a prior art control method.

The compressors 4 of the compressor rack 3 are controlled by a compressor control unit 6 on the basis of a measured suction pressure, $P_{suction}$. The condenser 5 is controlled by a condenser control unit (not shown) on the basis of a measured condenser pressure.

Each refrigeration entity 2 comprises a display case 8 containing products which need to be refrigerated, e.g. food stuff, an evaporator 9, and a control valve 10. The control valve 10 serves as on/off valve and as superheat (expansion) valve, and may be a solenoid valve. When the control valve 10 is a solenoid valve, the superheat is typically controlled by a pulse-width modulation approach. The control valve 10 is controlled by means of a hysteresis controller 11 ensuring that the temperature of air present in the display case 8 is controlled to be within a desired temperature band, and by means of a superheat controller 12 ensuring that an optimum filling is maintained in the evaporator 9.

The hysteresis controller 11 receives an input from a temperature probe 13 positioned inside the corresponding display case 8, the input indicating the temperature, $T_{air}$, of the air present in the display case 8. If $T_{air}$ reaches an upper limit (cut-in temperature) of the desired temperature band, the hysteresis controller 11 will cause the control valve 10 to open, thereby allowing a flow of refrigerant to pass across the evaporator 9. Thus, the evaporator 9 is switched to an active state, and refrigeration is provided for the contents of the display case 8. Similarly, if $T_{air}$ reaches a lower limit (cut-out temperature) of the desired temperature interval, the hysteresis controller 11 will cause the control valve 10 to close, thereby preventing a flow of refrigerant from passing across the evaporator 9. Thus, the evaporator 9 is switched to an inactive state, and refrigeration is no longer provided for the contents of the display case 8.

The superheat controller 12 receives an input from a superheat sensor 14 which measures the difference between the evaporating temperature and the temperature in the outlet of the corresponding evaporator 9. This is typically done by measuring the suction pressure, converting that to an evaporating temperature and subtracting this from a measured outlet temperature. It can alternatively be achieved by measuring the temperature in the inlet and outlet of the evaporator 9 and producing the difference. The superheat controller 12 controls the filling of refrigerant to the evaporator 9 in such a way that the liquid filled part of the evaporator 9 is maximised, while not allowing liquid refrigerant to exit the evaporator 9. The superheat controller 12 achieves that by adjusting the control valve 10 to obtain a small, but positive, superheat. By doing that it utilizes that the temperature profile in the evaporator 9 is substantially constant in the liquid filled region and is increasing in the dry region. Hence, a positive superheat temperature ensures that no liquid refrigerant exits the evaporator 9. By keeping the superheat temperature low the liquid region is maximised.

Figure 2:
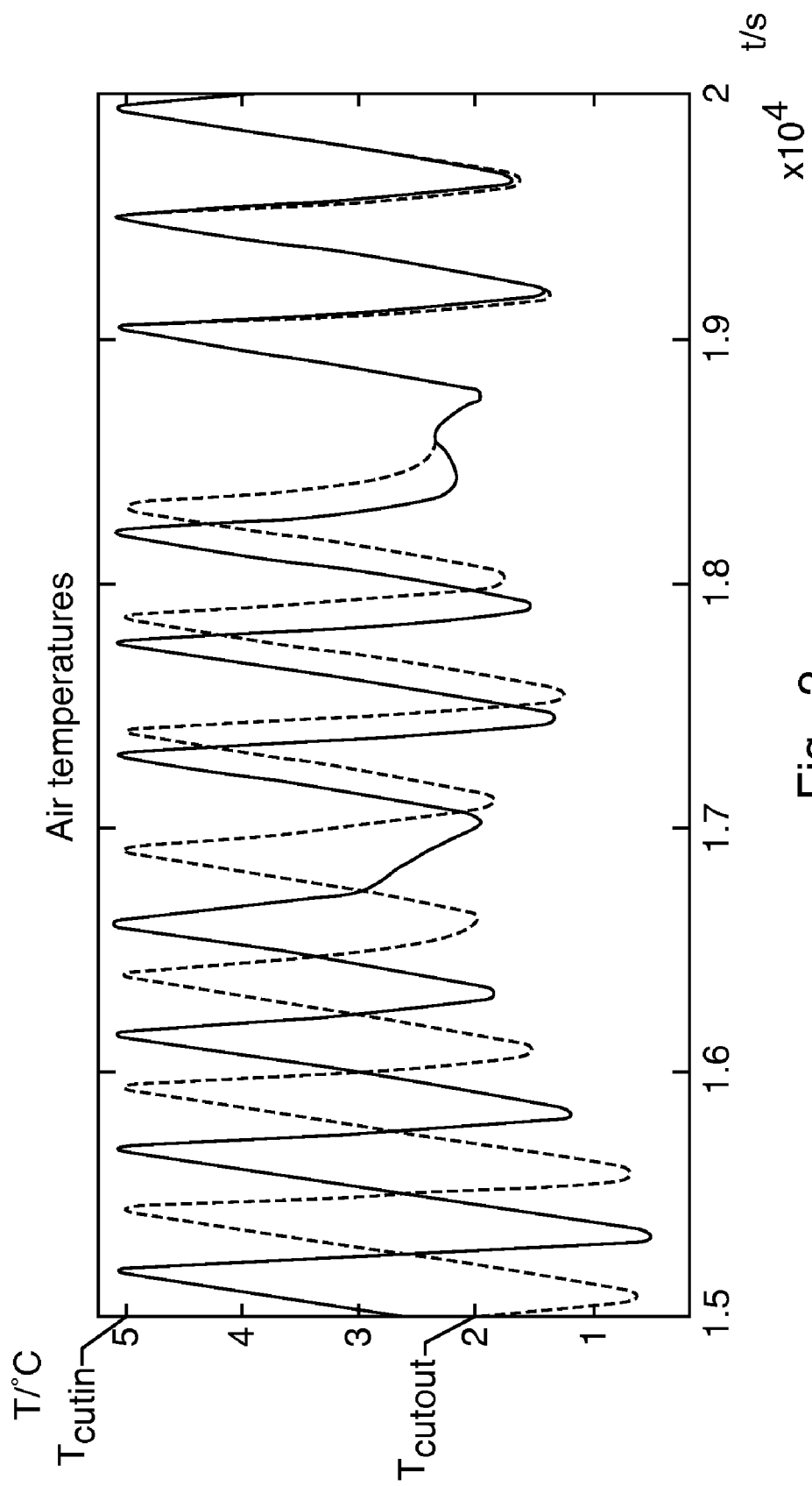
FIG. 2 is a graph showing temperature curves for the air temperature of two different refrigeration entities of the same refrigeration system as a function of time, the refrigeration system being controlled by means of a prior art control method.

FIG. 2 is a graph showing temperature curves 15, 16 for the air temperature of two different refrigeration entities of the same refrigeration system as a function of time. By 'air temperature' is meant the temperature of air present in the display cases corresponding to the respective refrigeration entities. It should be noted that, for the sake of clarity, FIG. 2 has been simplified in that it only shows temperature curves for two refrigeration entities, whereas there will normally be a much larger number of refrigeration entities in such a refrigeration system. As it appears from the graph, the two temperature curves 15, 16 are initially non-overlapping. Thus, the two corresponding refrigeration entities will not reach their cut-in temperatures or their cut-out temperatures simultaneously. In the Figure the cut-in temperature ($T_{cutin}$) is 5° C., and the cut-out temperature ($T_{cutout}$) is 2° C. for both refrigeration entities. Therefore, the refrigeration demand of the refrigeration system comprising these refrigeration entities will not vary significantly as a function of time. However, the time periods for the two refrigeration entities, i.e. the time interval elapsing from an evaporator is switched to the active state until the next time the evaporator is switched to the active state, are very similar. This poses a potential risk that the two evaporators may, at a later point in time, begin to run in a synchronized manner, even if they are not doing so initially.

Around the time $t=1.7\times10^4$ s the evaporator of the refrigeration entity corresponding to temperature curve 16 is, for some reason, having difficulties in driving the air temperature down. It therefore takes longer time for that refrigeration entity to reach the cut-out temperature. As a consequence the time at which the corresponding evaporator is switched to the inactive state is delayed. This, in turn, has the consequence that this time appears very close to the time at which the evaporator corresponding to temperature curve 15 is switched to the inactive state. Therefore the two temperature curves 15, 16 are much closer to each other afterwards, and the cut-in temperatures and the cut-out temperatures of the two refrigeration entities are reached with a small time interval. This results in variations in the refrigeration demand.

Around the time $t=1.85\times10^4$ s the evaporator of the refrigeration entity corresponding to temperature curve 16 is once again having difficulties in driving the air temperature down. This time the result is that the two temperature curves 15, 16 are almost overlapping, and the cut-in temperatures and the cut-out temperatures are reached almost simultaneously, resulting in large variations in the refrigeration demand. Thus, the two refrigeration entities are now running in a synchronized manner. This is very undesirable. As mentioned above, this problem seems to be self-increasing in the sense that once two refrigeration entities of a refrigeration system are running in a synchronized manner, the remaining refrigeration entities of the refrigeration system seem to be 'attracted' to these, and an increasing number of refrigeration entities will thereby start to run in a synchronized manner.

FIG. 2 illustrates that even though synchronization does not occur initially, a slight change in the operation conditions of the refrigeration system may cause two evaporators having similar time periods to begin running in a synchronized manner. Therefore, similar time periods should be avoided to the greatest possible extent.

Figure 3:
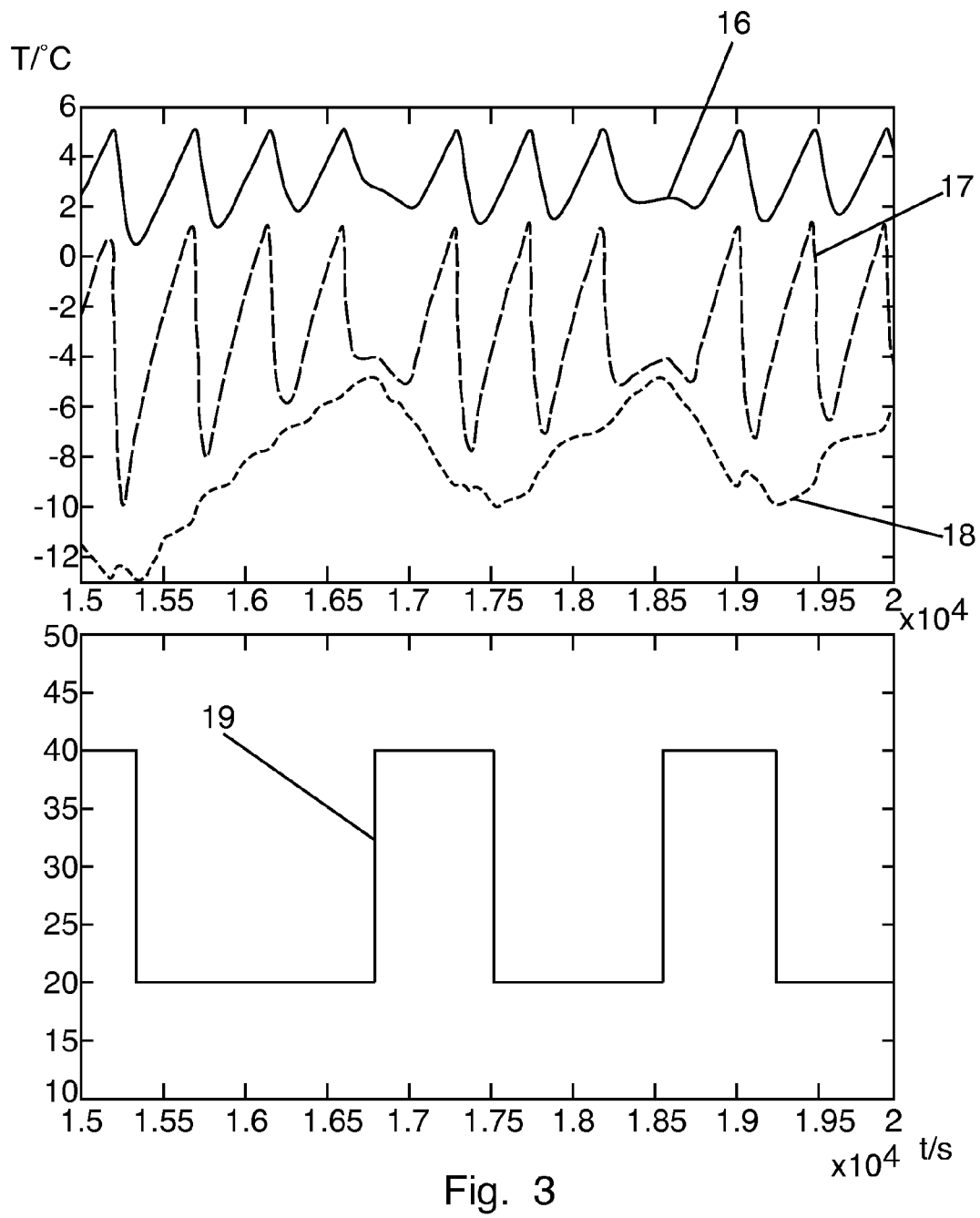
FIG. 3 is a graph showing relevant temperature curves for one of the refrigeration entities of FIG. 2 as a function of time, as well as compressor capacity of a refrigeration system comprising the refrigeration entity as a function of time.

FIG. 3 is a graph showing relevant temperature curves for the refrigeration entities corresponding to temperature curve 16 of FIG. 2, as a function of time, as well as compressor capacity of a refrigeration system comprising the refrigeration entity, as a function of time. This Figure illustrates why the evaporator of this refrigeration entity is having difficulties in driving the air temperature down, leading to the undesired synchronization of the evaporators described above.

The upper part of FIG. 3 shows the air temperature 16, evaporator temperature 17 and evaporating temperature 18 of the refrigeration entity as a function of time. The lower part shows the compressor capacity 19 of the refrigeration system, also as a function of time. The time scales of the two parts of FIG. 3 are identical, and the relation between the compressor capacity 19 and the various temperatures 16, 17, 18 may therefore be derived.

Approximately at time $t=1.55\times10^4$ s the compressor capacity is decreased by twenty units. This corresponds to one compressor of the compressor rack being switched off. This has the consequence that the suction pressure measured at a point immediately upstream relatively to the compressor rack increases. The increase in suction pressure causes the evaporating temperature 18, i.e. the temperature of the evaporating refrigerant, to also increase, since there is a unique relationship between the suction pressure and the evaporating temperature 18. This relationship is well known, and the increase in evaporating temperature 18 appears from the Figure.

The evaporator temperature 17, i.e. the temperature of an evaporating surface of the evaporator, can not at any time be lower than the evaporating temperature 18, since it is not possible for the refrigerant to cool the evaporator below this temperature. Therefore the increasing evaporating temperature 18 has the consequence that the lowest possible evaporator temperature 17 also increases. In the Figure this can be seen in that the 'valleys' of the evaporator temperature curve 17 become less and less 'deep' as the evaporating temperature 18 increases. This, in turn, has the consequence that the total refrigeration capacity of the evaporator is reduced.

The refrigeration capacity of an evaporator can be regarded as two parts, a first part which balances the load on the refrigeration entity, and a second part which provides refrigeration for the contents of the refrigeration entity, i.e. the second part is used for driving the air temperature of the refrigeration entity down. It can be assumed that the first part is at least substantially constant. Therefore, a reduction in the total refrigeration capacity will have a huge influence on the ability of the evaporator to driving the air temperature down. This effect is seen in the Figure just before $t=1.7\times10^4$ s where it is clear that the air temperature 16 does not reach the cut-out temperature within a reasonable time.

As a consequence a compressor is switched on around $t=1.7\times10^4$ s, thereby increasing the compressor capacity 19 by twenty units. This has the effect that the suction pressure is decreased, and the evaporating temperature 18 therefore also starts to decrease. After a while the evaporating temperature 18 becomes sufficiently low to provide sufficient refrigeration capacity to allow the air temperature 16 to reach the cut-out temperature. Thus, the refrigeration entity once again starts to run in an appropriate manner.

However, around $t=1.75\times10^4$ s a compressor is once again switched off, and the compressor capacity reduced by twenty units. The scenario described above is repeated resulting in the problems arising around $t=1.85\times10^4$ s as described in connection with FIG. 2.

Figure 4:
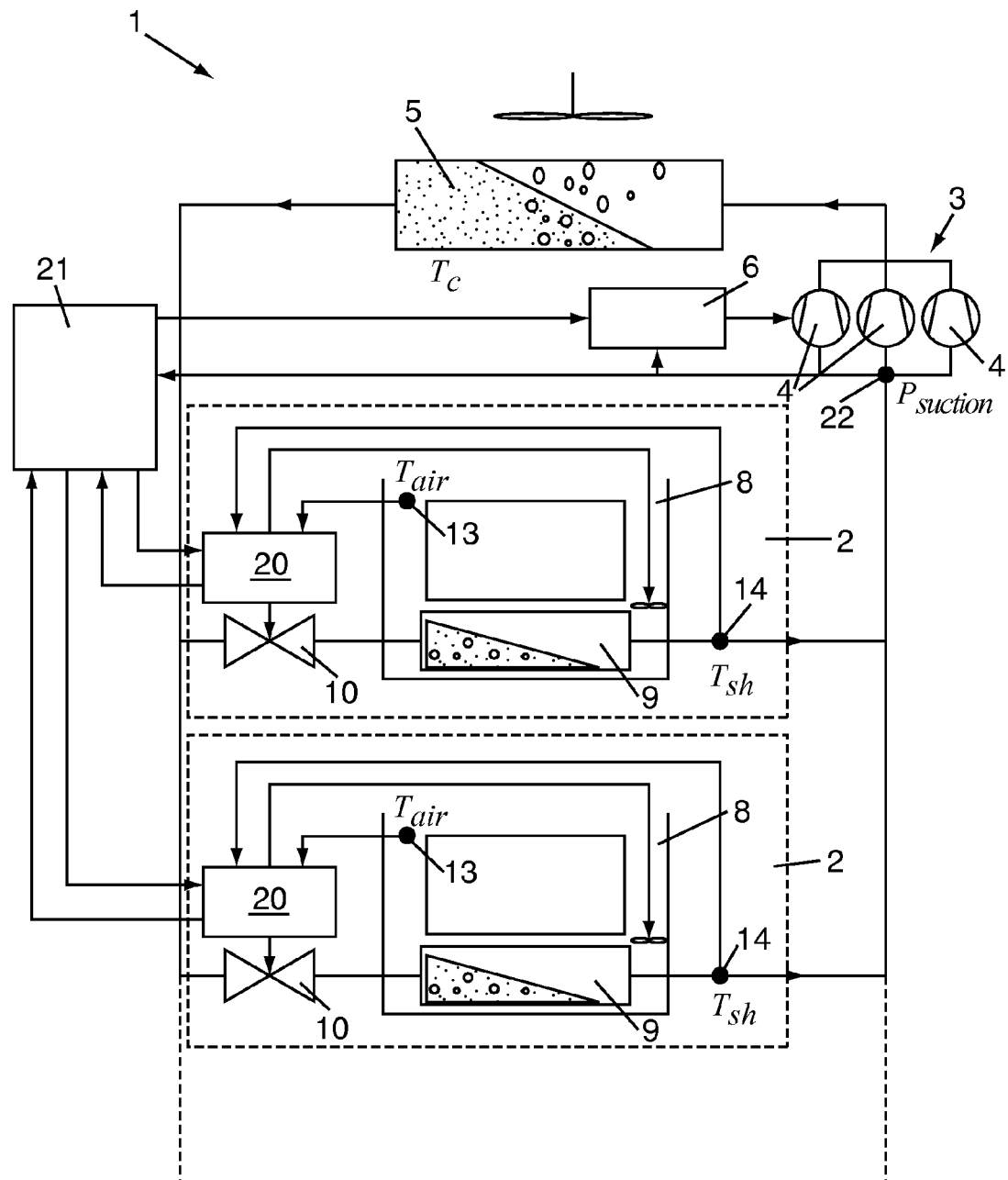
FIG. 4 is a schematic drawing of a refrigeration system comprising a number of refrigeration entities, the refrigeration system being controlled by means of a control method according to an embodiment of the invention.

FIG. 4 is a schematic drawing of a refrigeration system 1 comprising a number of refrigeration entities 2, the refrigeration system 1 being controlled by means of a control method according to an embodiment of the invention. The refrigeration system 1 further comprises a compressor rack 3 comprising three compressors 4, and a condenser 5 as described above. Each refrigeration entity 2 comprises a display case 8, an evaporator 9 and a control valve 10. The control valve 10 is controlled by means of a valve control unit 20. The valve control unit 20 receives inputs from temperature probe 13 as well as superheat sensor 14, and is thereby capable of controlling the control valve 10 in accordance with a hysteresis control strategy and in accordance with a superheat control strategy as described above.

The refrigeration system 1 further comprises a central control unit 21. The central control unit 21 receives inputs from the valve control units 20 of each refrigeration entity 2. These inputs provide information regarding whether the corresponding evaporator 9 is in an active or an inactive state and, optionally, information regarding when and/or how frequently the evaporator 9 has been switched between the two states. The central control unit 21 also receives an input from a probe 22 measuring the suction pressure, $P_{suction}$, immediately upstream relatively to the compressor rack 3.

Figure 6:
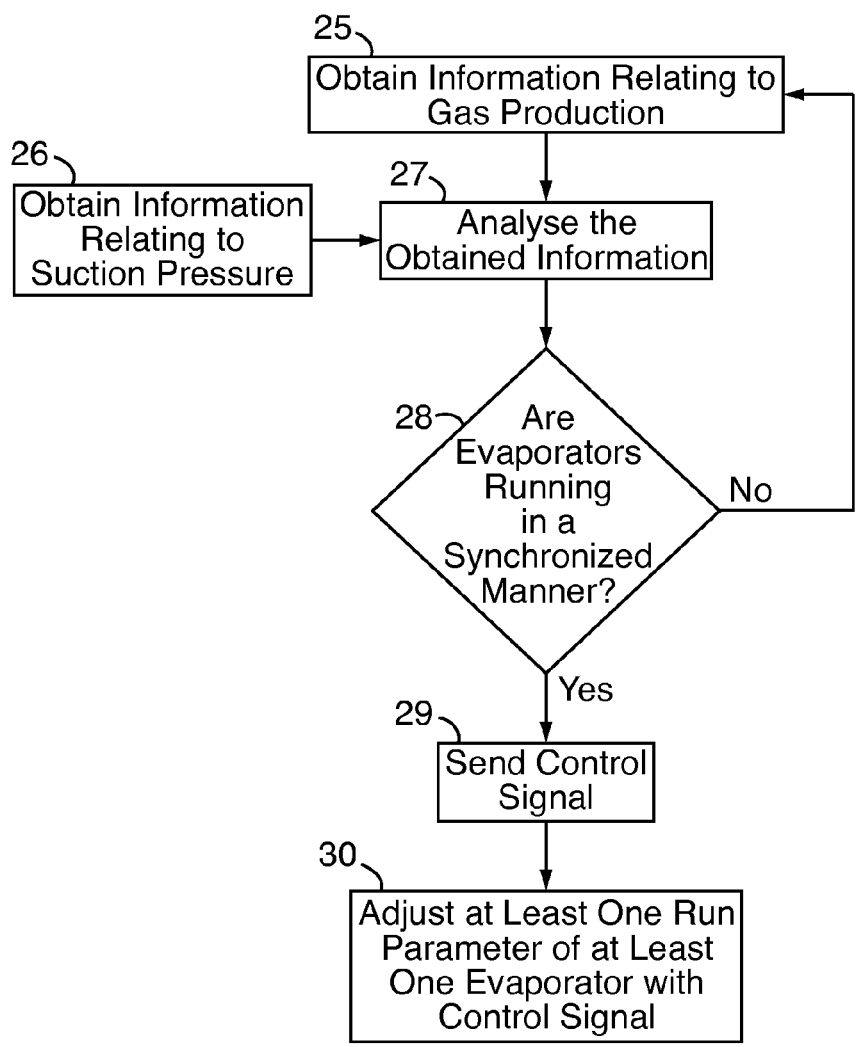
FIG. 6 is a flowchart showing the control method controlling the refrigeration system of FIG. 4.

Thus, referring to FIG. 6, the central control unit 21 receives information relating to which evaporators 9 are in the active/inactive state in step 25. The central control unit 21 may also receive information relating to the suction pressure, $P_{suction}$, in step 26. Using the received information, the central control unit 21 performs an analysis in step 27 in order to determine whether or not two or more of the evaporators 9 are running in a synchronized manner. This analysis may, comprise any appropriate analysis as described previously or as described below.

Figure 7:
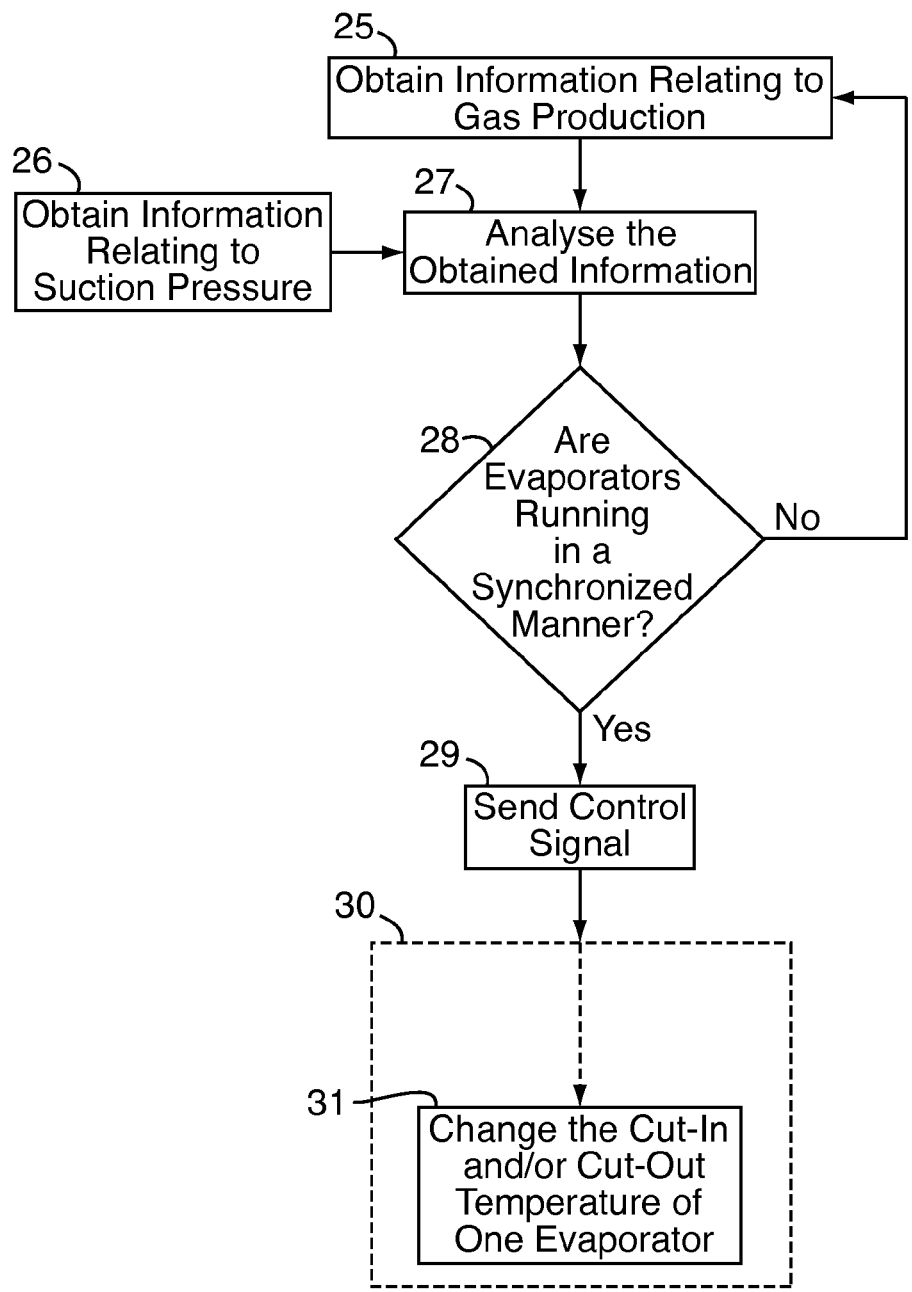
FIG. 7 is a flowchart showing an embodiment of the control method of FIG. 6.
Figure 8:
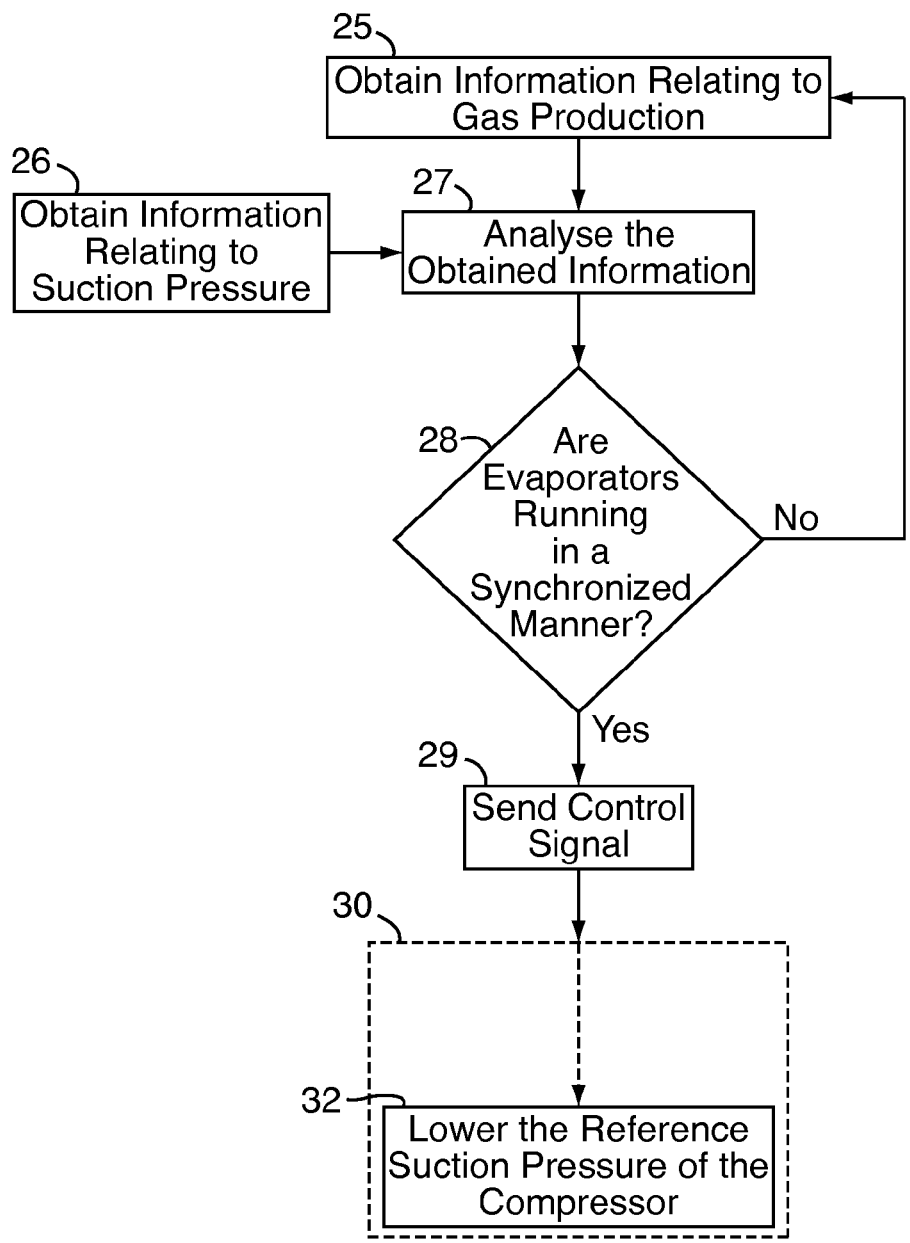
FIG. 8 is a flowchart showing another embodiment of the control method of FIG. 6.
Figure 9:
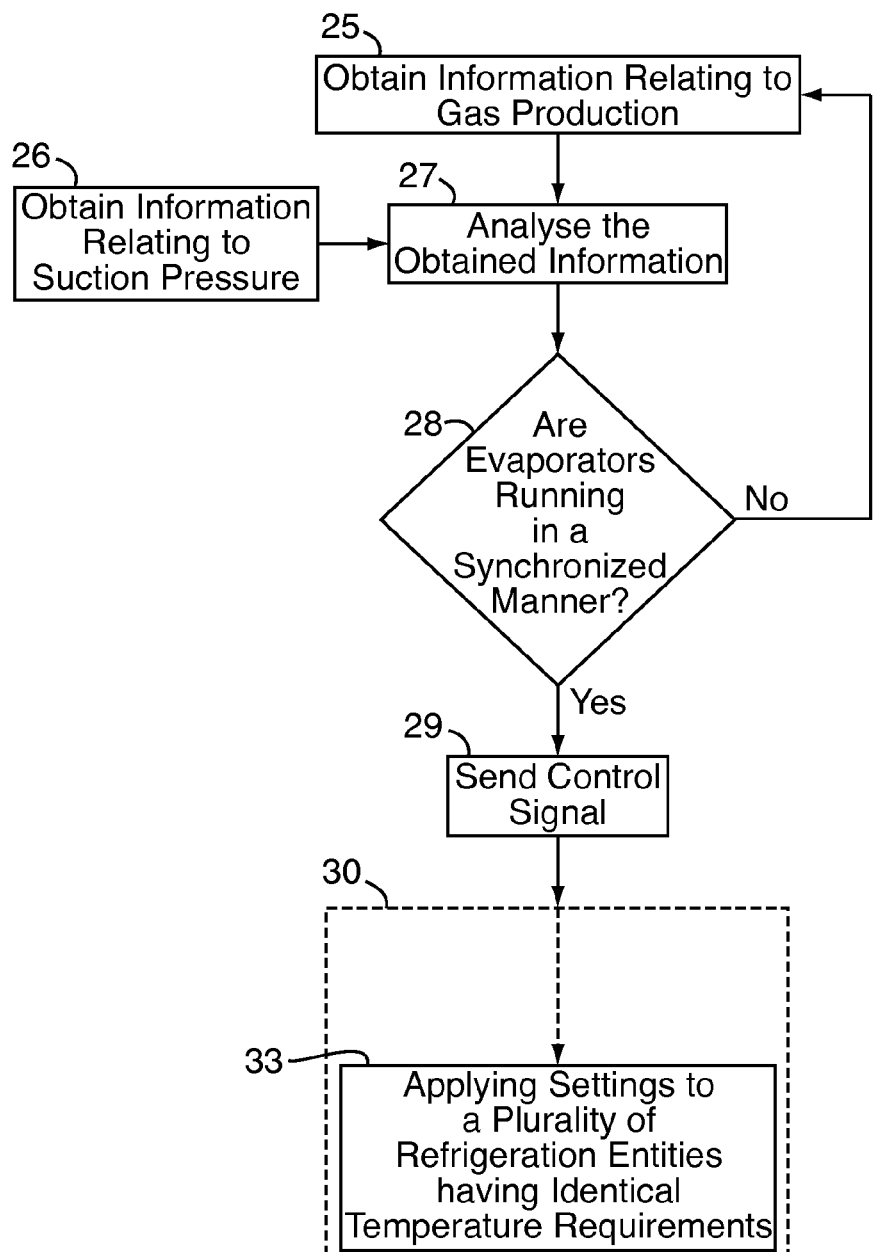
FIG. 9 is a flowchart showing yet another embodiment of the control method of FIG. 6.

If the analysis reveals that two or more of the evaporators 9 are running in a synchronized manner, i.e. the answer to step 28 is yes, the central control unit 21 sends appropriate control signals to the relevant valve control unit(s) 20 and/or to the compressor control 6 in step 29. In step 30, the control signal is used to adjust at least on run parameter of at least one evaporator to cause the two evaporators 9 to stop running in a synchronized manner. For example, referring to FIG. 7, a control signal sent to a valve control unit 20 may cause the cut-in and/or the cut-out temperature of the corresponding refrigeration entity 2 to be changed at 31. This has the effect that the average time period for that refrigeration entity 2 is changed at 31. Thus, if the evaporator 9 of the refrigeration entity 2 in question was running in a synchronized manner relative to another evaporator 9, this changed time period will cause the two evaporators 9 to stop running in a synchronized manner. This will be further described below. Alternatively, a signal sent to the valve control unit 20 in step 30 may cause the superheat set point to be changed in order to increase the superheat. Referring to FIG. 8, in some embodiments, the adjusting step 30 may comprise lowering a reference suction pressure of the compressor(s) at 32. Referring to FIG. 9, in some embodiments, adjusting step 30 may include applying settings to a plurality of refrigeration entities having identical temperature requirements at 33. The settings may comprise a lower temperature limit and an upper temperature limit, wherein an evaporator of the corresponding refrigeration entity is switched to an inactive state in case an air temperature of the refrigeration entity decreases below the lower temperature limit, and the evaporator is switched to an active state in case the air temperature increases above the upper temperature limit, the lower temperature limit and the upper temperature limit thereby defining a deadband temperature interval.

Figure 10:
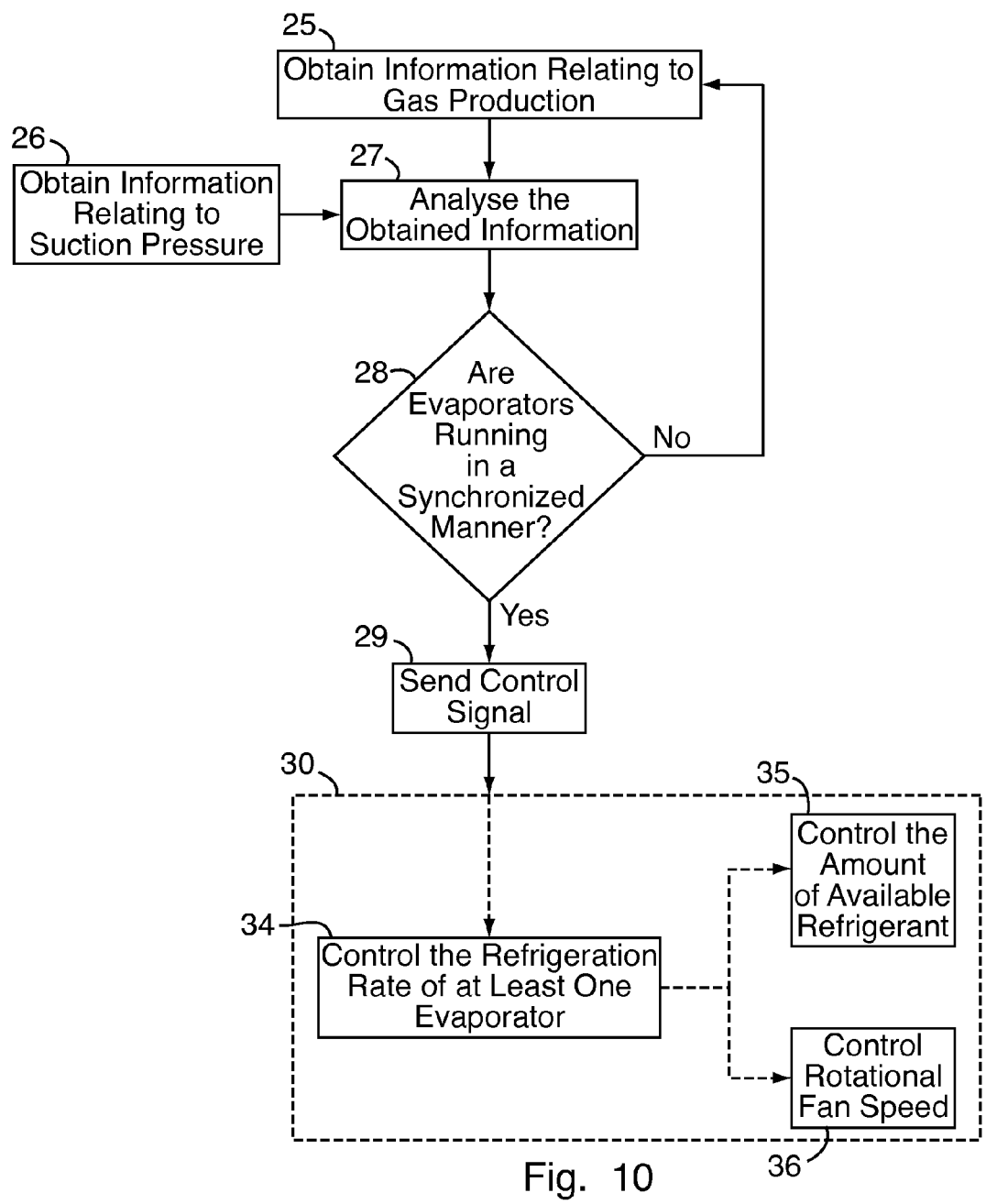
FIG. 10 is a flowchart showing another embodiment of the control method of FIG. 6.

Referring to FIG. 10, in some embodiments, the adjusting step 30 may comprise controlling a refrigeration rate of at least one evaporator at step 34. This may, e.g., be done by controlling a refrigeration capacity of at least one evaporator by controlling the amount of available refrigerant at step 35. This may also include 'starving' the evaporator, i.e. by reducing the amount of refrigerant entering the evaporator. This may, e.g., be done by increasing the superheat of the evaporator in question. Alternatively, a refrigeration rate of at least one evaporator may be controlled by controlling a rotational speed of a fan positioned at or near the evaporating surface of at least one evaporator at step 36.

Figure 11:
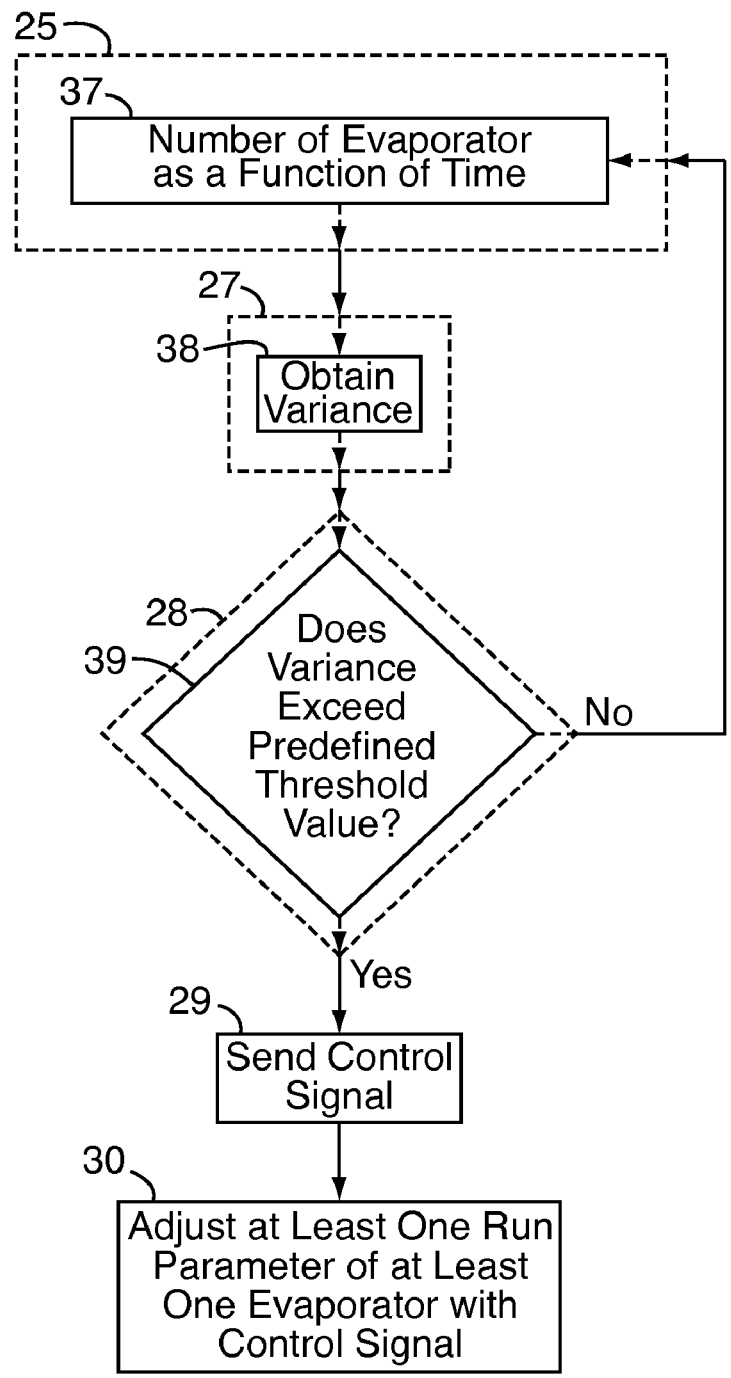
FIG. 11 is a flowchart showing yet another embodiment of the control method of FIG. 6.

Referring to FIG. 11, as discussed above, the central control unit 21 receives information relating to which evaporators 9 are in the active/inactive state in step 25. In some embodiments, this information may comprise obtaining information relating to the number of active evaporators 9 as a function of time at step 37. In these embodiments, analysing step 27 may comprise obtaining a representative of the variance of the function of time at step 38. In this case the determining step 28 may comprise determining that at least two evaporators 9 are running in a synchronized manner if the representative of the variance exceeds a predefined threshold value at 39.

Figure 12:
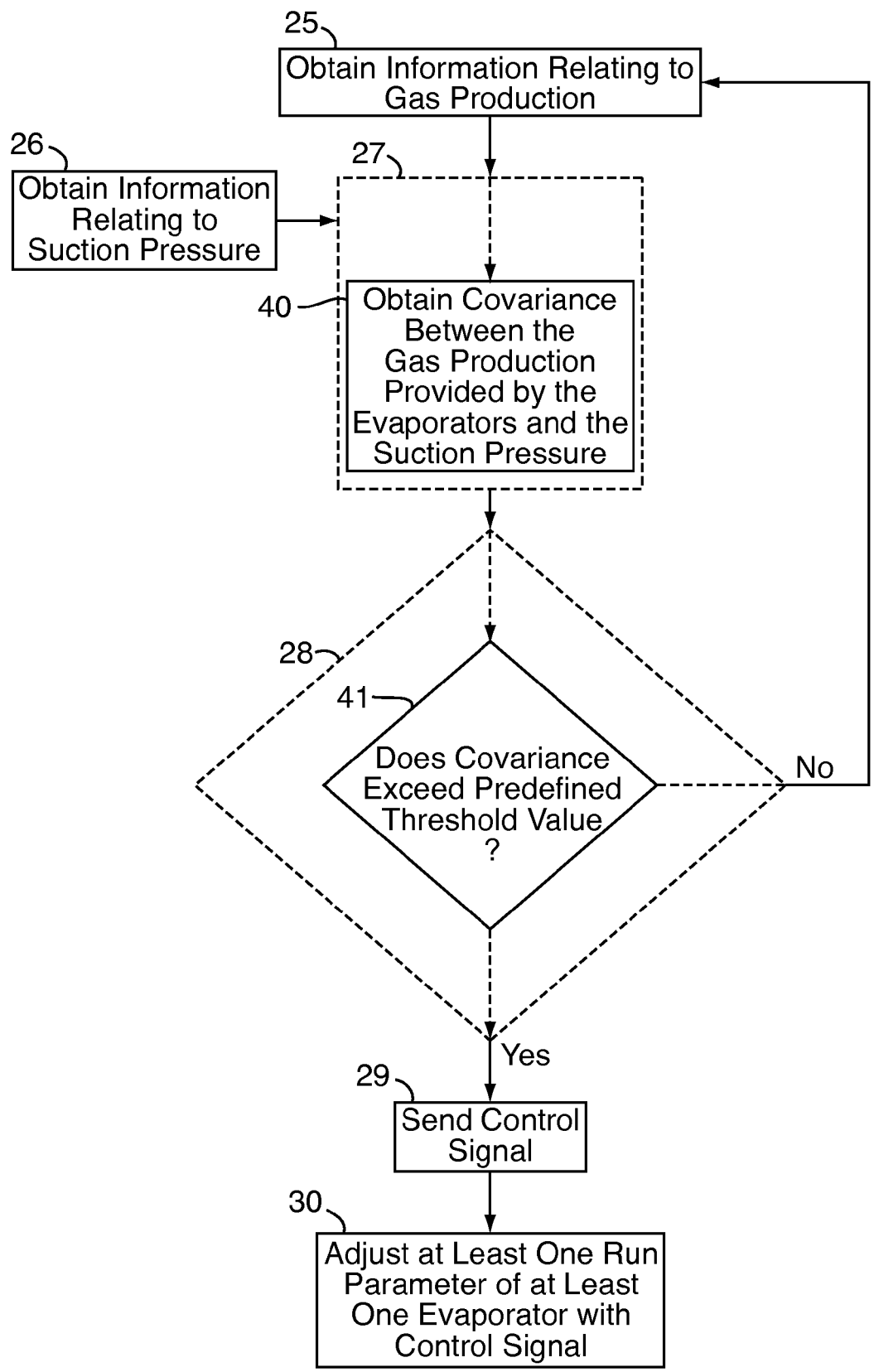
FIG. 12 is a flowchart showing another embodiment of the control method of FIG. 6.

Referring to FIG. 12, in some embodiments, the analysis of step 27 may include obtaining the covariance between the suction pressure, $P_{suction}$, and the number of active evaporators 9 at step 40. In these embodiments, determining step 28 may comprise determining that at least two evaporators are running in a synchronized manner if said covariance exceeds a predefined threshold value at step 41.

Figure 13:
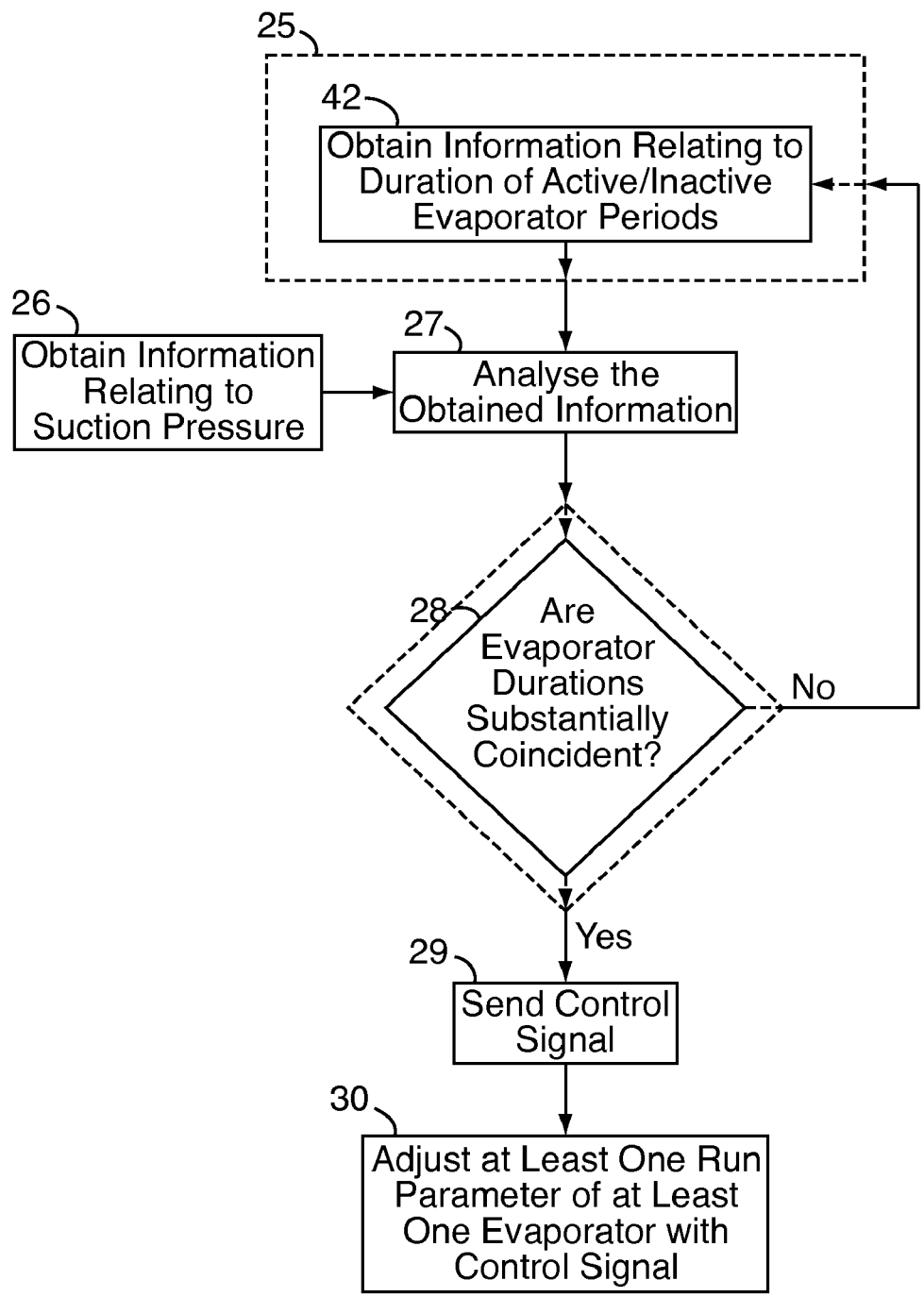
FIG. 13 is a flowchart showing yet another embodiment of the control method of FIG. 6.

Referring to FIG. 13, in some embodiments, the step of obtaining information at 25 may comprise obtaining information relating to durations of active and/or inactive periods for each evaporator at step 42, and the determining step 28 may comprise determining that at least two evaporators are running in a synchronized manner if said durations are at least substantially coinciding for at least two evaporators at step 43.

A control signal sent to the compressor control 6 may cause a reference suction pressure to be temporarily lowered. This is typically done by switching a compressor 4 on. Temporarily lowering the reference suction pressure has the effect that the evaporating temperatures of the refrigeration entities 2 of the refrigeration system 1 are lowered. Thereby the tendency of the evaporators 9 to 'attract' each other and start to run in a synchronized manner as described in connection with FIGS. 2 and 3 is counteracted. This is typically performed in addition to other measures, such as changing the cut-in and/or cut-out temperature for one or more refrigeration entities, and it enhances the effects caused by these other measures.

Figure 5:
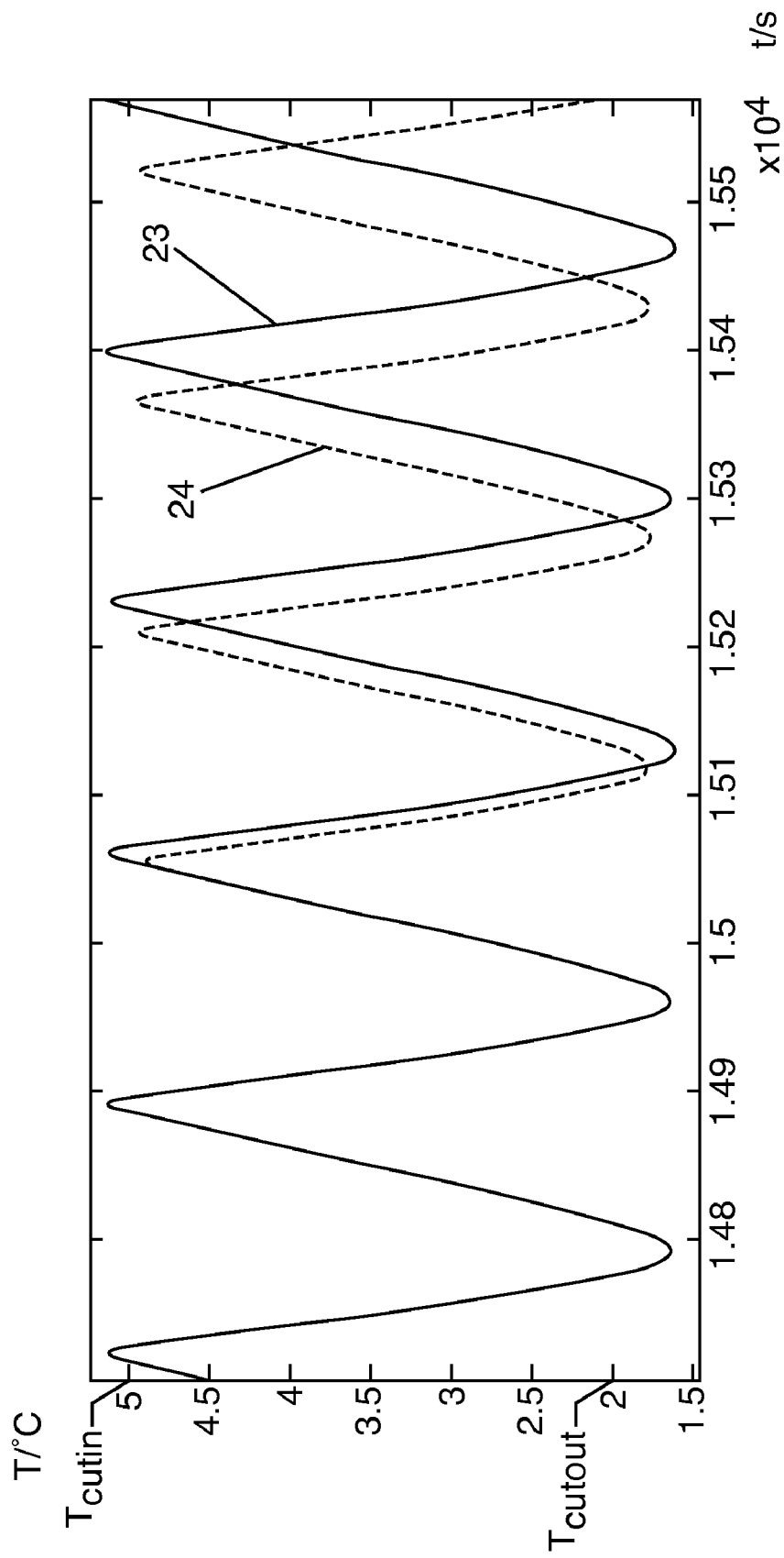
FIG. 5 is a graph showing temperature curves for the air temperatures of two different refrigeration entities of the same refrigeration system as a function of time, the refrigeration system being controlled by means of a control method according to an embodiment of the invention.

FIG. 5 is a graph showing temperature curves 23, 24 for the air temperatures of two different refrigeration entities of the same refrigeration system as a function of time. The graph of FIG. 5 illustrates a refrigeration system which is controlled by means of a control method according to an embodiment of the invention.

As it appears from the Figure the two curves 23, 24 are initially coinciding, i.e. the evaporators of the two refrigeration entities are running in a synchronized manner. This is detected, and around the time $t=1.5\times10^4$ s a signal is sent to the control unit which controls the evaporator corresponding to temperature curve 24. In response to the received signal, the control unit decreases the cut-in temperature for the evaporator corresponding to temperature curve 24 from $T_{cutin}=5°$ C. to $T_{cutin}=4.9°$ C., and increases the cut-out temperature for the same evaporator from $T_{cutout}=2°$ C. to $T_{cutout}=2.1°$ C. Thus, the deadband for that evaporator is made narrower. As a consequence the air temperature 24 reaches the cut-in temperature slightly prior to the time where the air temperature 23 reaches the cut-in temperature, and the evaporator corresponding to temperature curve 24 is therefore switched to an active state before the evaporator corresponding to temperature curve 23.

Furthermore, temperature curve 24 subsequently reaches the cut-out temperature before temperature curve 23. This is due to the increased cut-out temperature for the evaporator corresponding to temperature curve 24, as well as to the fact that this evaporator was switched to the active state before the evaporator corresponding to temperature curve 23. The consequence of narrowing the deadband for one of the evaporators is thereby that the time period elapsing from the evaporator is switched to the active state until the next time the evaporator is switched to the active state, is decreased for that evaporator. This will have the effect that the two evaporators no longer are switched between the active and inactive states simultaneously, i.e. the evaporators will stop running in a synchronized manner.

As it appears from FIG. 5 this effect becomes more pronounced as time elapses. Thus, by narrowing the deadband for one of the evaporators, thereby reducing the time period elapsing from the evaporator is switched to the active state until the next time the evaporator is switched to the active state, the problems arising from the synchronization between the two evaporators have been solved.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of analysing a refrigeration system comprising at least one compressor, at least one condenser, at least one control unit and at least two refrigeration entities, each having a separate refrigeration volume, and each comprising at least one evaporator controlled by the control unit, each evaporator being adapted to be in an active state in which a flow of refrigerant is allowed to pass across an evaporating surface, and in an inactive state in which such a flow is prevented, the method comprising the steps of:

obtaining information at the control unit relating to the gas production provided by the evaporators as a function of time, wherein the information relating to the gas production provided by the evaporators comprises information relating to the number of active evaporators as a function of time, analysing the obtained information within the control unit, the analyzing step comprising obtaining a representative of the variance of the function of time, based on the analysing step, determining whether or not two or more of the evaporators are running in a synchronized manner, wherein it is determined that at least two evaporators are running in a synchronized manner if the representative of the variance exceeds a predefined threshold value, sending at least one control signal when it is determined that two or more evaporators are running in a synchronized manner, and adjusting at least one run parameter, wherein the adjusting step is selected from the group consisting of:

changing at least one of a cut-in temperature and a cut-out temperature for at least one evaporator, thereby changing the duration of the active and/or inactive periods for the at least one evaporator, said at least one evaporator reaching the cut-in temperature and/or the cut-out temperature before the other evaporator, lowering a reference suction pressure of the compressor for a period of time, and applying settings to a plurality of refrigeration entities having identical temperature requirements, the settings comprising a lower temperature limit and an upper temperature limit, wherein an evaporator of the corresponding refrigeration entity is switched to an inactive state in case an air temperature of the refrigeration entity decreases below the lower temperature limit, and the evaporator is switched to an active state in case the air temperature increases above the upper temperature limit.

2. A method of analyzing a refrigeration system comprising at least one compressor, at least one condenser, at least one control unit, and at least two refrigeration entities, each refrigeration entity having a separate refrigeration volume, and each refrigeration entity comprising at least one evaporator controlled by the control unit, each evaporator being adapted to be in an active state in which a flow of refrigerant is allowed to pass across an evaporating surface, and in an inactive state in which such a flow is prevented, the method comprising the steps of obtaining information at the control unit relating to the gas production provided by the evaporators as a function of time, obtaining information relating to a suction pressure of the compressor(s), analyzing the obtained information within the control unit, based on the analyzing step, determining whether or not two or more of the evaporators are running in a synchronized manner, and sending at least one control signal when it is determined that two or more evaporators are running in a synchronized manner, and adjusting at least one run parameter, wherein the adjusting step is selected from the group consisting of:

changing at least one of a cut-in temperature and a cut-out temperature for at least one evaporator, thereby changing the duration of the active and/or inactive periods for the at least one evaporator, said at least one evaporator reaching the cut-in and/or the cut-out temperature before the other evaporator, lowering a reference suction pressure of the compressor for a period of time, and applying settings to a plurality of refrigeration entities having identical temperature requirements, the settings comprising a lower temperature limit and an upper temperature limit, wherein an evaporator of the corresponding refrigeration entity is switched to an inactive state in case an air temperature of the refrigeration entity decreases below the lower temperature limit, and the evaporator is switched to an active state in case the air temperature increases above the upper temperature limit; and further comprising the step of obtaining information relating to a suction pressure of the compressor(s), and wherein the analysing step comprises obtaining a covariance between the information relating to the gas production provided by the evaporators and the information relating to a suction pressure, and wherein the determining step comprises determining that at least two evaporators are running in a synchronized manner if said covariance exceeds a predefined threshold value.

3. The method according to claim 1 or claim 2, wherein the step of obtaining information comprises obtaining information relating to durations of active and/or inactive periods for each evaporator, and wherein the determining step comprises determining that at least two evaporators are running in a synchronized manner if said durations are at least substantially coinciding for at least two evaporators.

4. The method according to claim 1 or claim 2, further comprising the step of adjusting at least one run parameter of at least one evaporator with the at least one control signal in case the determining step reveals that at least two evaporators are running in a synchronized manner.

5. The method according to claim 4, wherein the adjusting step comprises controlling a refrigeration rate of at least one evaporator.

6. The method according to claim 5, wherein the controlling step comprises controlling a refrigeration capacity of at least one evaporator by controlling the amount of available refrigerant.

7. The method according to claim 5, wherein the controlling step comprises controlling a rotational speed of a fan positioned at or near the evaporating surface of at least one evaporator.

* * * * *